(12) United States Patent
Jornow et al.

(10) Patent No.: US 9,417,864 B2
(45) Date of Patent: Aug. 16, 2016

(54) SYSTEM, METHOD, AND DEVICE FOR NOTIFICATION AND INSTALLATION OF APPLICATIONS IN ACCORDANCE WITH CALCULATED DATA

(71) Applicant: KING.COM LIMITED, St. Julians (MT)

(72) Inventors: Lars Jornow, Stockholm (SE); Andreas Geidnert, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 14/689,851

(22) Filed: Apr. 17, 2015

(65) Prior Publication Data

US 2015/0301817 A1    Oct. 22, 2015

(30) Foreign Application Priority Data

Apr. 17, 2014    (GB) .................................. 1406954.6

(51) Int. Cl.
*G06F 9/445*    (2006.01)
(52) U.S. Cl.
CPC ........................................ *G06F 8/64* (2013.01)
(58) Field of Classification Search
None
See application file for complete search history.

(56) References Cited

U.S. PATENT DOCUMENTS

| | | | | |
|---|---|---|---|---|
| 9,223,562 | B1 * | 12/2015 | Sobel | ............ G06F 8/65 |
| 2012/0266155 | A1 * | 10/2012 | Valeriano | ............ G06F 8/65 |
| | | | | 717/172 |
| 2013/0097101 | A1 * | 4/2013 | Ortiz | ............ G06Q 30/02 |
| | | | | 706/11 |
| 2014/0047429 | A1 * | 2/2014 | Gaither | ............ G06F 8/60 |
| | | | | 717/170 |
| 2015/0088955 | A1 * | 3/2015 | Hendrick | ............ H04L 67/10 |
| | | | | 709/201 |

* cited by examiner

*Primary Examiner* — Daxin Wu
(74) *Attorney, Agent, or Firm* — Saul Ewing LLP (57) ABSTRACT

A system comprising a server in communication with a user device configured to run a plurality of applications. A data structure is held in the system, said data structure comprising multiple entries, wherein each entry associates an application pairing with a weighting, each application pairing comprising a source installation and a target installation. The user device running an application corresponding to one of the source installations selects one of the target installations to download from the server on the basis of the weightings, wherein each of the weightings is for the source installation is proportional to probability of the respective target installation being selected and installed.

24 Claims, 9 Drawing Sheets

|  | Target Game | | | |
|---|---|---|---|---|
|  | Candy Crush Saga | Pet Rescue Saga | Farm Heroes Saga | Pepper Panic Saga |
| Candy Crush Saga | X | 1 | 3 | 6 |
| Pet Rescue Saga | 2 | X | 6 | 2 |
| Farm Heroes Saga | 2 | 3 | X | 5 |
| Pepper Panic Saga | 4 | 2 | 4 | X |

Source Game

SYSTEM, METHOD, AND DEVICE FOR NOTIFICATION AND INSTALLATION OF APPLICATIONS IN ACCORDANCE WITH CALCULATED DATA

CROSS REFERENCE TO RELATED APPLICATION

This application is based on and claims priority to British Application No. GB1406954.6, filed Apr. 17, 2014, the entire contents of which are fully incorporated herein by reference.

FIELD OF THE INVENTION

Some embodiments may relate to installation of, for example applications and application data and other user associated data in an online environment. Some embodiments may relate to computer devices connected in a communications network with at least one database storing said data. The computer devices may be configured to selectively communicate with each other over the network. Some embodiments may relate to notification and installation of applications in accordance with said data.

BACKGROUND OF THE INVENTION

The advent of the internet, and other wide area networks, has led to a proliferation of connected user or client devices, typically running installations from providers of their choice. It can be problematic for a user to find or even be aware of other choices or options regarding installations from the provider or their partners.

Furthermore, simply offering the installation may take no account of previous installations, or user preferences. In particular, the plethora of user or client devices and architectures can provide a barrier to such installations for a service provider and user alike.

SUMMARY OF INVENTION

The inventors have recognised that a platform independent scheme and mechanism for offering installations is desirable.

According to a first aspect, there is provided a system comprising at least one server having at least one memory holding a data structure comprising multiple entries, wherein each entry associates an application pairing with a weighting, each application pairing comprising a source installation and a target installation, and multiple targets, and at least one processor configured to execute a target selection algorithm which selects a set of weightings to be transmitted to a client or user device wherein said client or user device is in communication with the at least one server and comprises a processor configured: to execute a source installation, to detect a target requirement in execution of the source installation and to generate a target required signal to the at least one server, to receive the set of weightings, to generate a set of range fractions from the weightings, each range representing a target installation and having a proportion of the range corresponding to the weighting, and to select randomly a number falling in the range and to request from the server a notification of a target installation represented by the fraction of the range containing the number.

In an embodiment, the set of weightings are transmitted to a client or user device responsive to a target requirement signalled from the client.

In an embodiment, said weightings may be numeric.

In an embodiment, said weightings may be numeric integers.

In another embodiment said weightings may be selected as pairings including at least the source game being executed at the client device.

In yet another embodiment the installations may comprise computer implemented programs in the form of applications. Optionally, the applications may comprise computer implemented games, or may comprise computer implemented office suite or productivity applications.

In an embodiment, the data structure may include selection parameters which identify user or client characteristics, the weighting being based on one or more of the user or client characteristics. The one or more user or client characteristics may comprise the location of the user or client, or may additionally or alternatively comprise the platform or operating system of the user or client.

In another embodiment, the weightings may be equal in the absence of user or client characteristics.

In yet another embodiment, the weightings may be non-equal based on the one or more user or client characteristics.

In another embodiment, the weightings may be based on key performance indicators collected by said at least one server, and optionally the key performance indicators collected by said at least one server may be altered or varied to modify the weightings.

In yet another embodiment, the at least one server may be configured to provide or modify a notification provided to the client or user device.

In yet another embodiment, the client or user device may be configured to determine the location of said device and comprise a transceiver to provide said at least one server said determined location.

In yet another embodiment, the client or user device may be configured to further receive an asset associated with the source or target installation upon selection of said target installation. The received asset may comprise one or more game objects selected from one or more of real world currency, in-game currency, application currency, in game lives, boosters, gifts, a reward comprising an automatic promotion to a level or rank of the source installation.

In another aspect, there is provided a client or user device comprising at least one processor configured to receive via a communication link with at least one server a source installation and to execute said source installation, and further configured to detect a target requirement in execution of the source installation and to generate a target required signal to the at least one server via said communication link, to receive a set of weightings from said server, to generate a set of range fractions from the weightings, each range representing a target installation provided by said at least one server and having a proportion of the range corresponding to the weighting, and to select, based on random number generation, a number falling within the range and to request from the at least one server a notification of a target installation represented by the fraction of the range containing the number.

In yet another aspect, there is provided a server comprising at least one memory holding a data structure comprising multiple entries, wherein each entry associates an application pairing with a weighting, each application pairing comprising a source installation and a target installation, and multiple targets, and at least one processor configured to execute a target selection algorithm which selects a set of weightings to be transmitted to a client or user device, to transmit the set of weightings to said client or user device, and to provide a notification of the target installation based on where a random number generated by said client or user device falls within a fraction of a generated range containing the number.

In a further aspect, there is provided a method of controlling an installation in a client or user device operable to communicate with at least one server having at least one memory holding a data structure comprising multiple entries, wherein each entry associates an application pairing with a weighting, each application pairing comprising a source installation and a target installation, and multiple targets, the method comprising: executing a target selection algorithm which selects a set of weightings to be transmitted to the client or user device responsive to a target requirement signalled from the client or user device; executing a source installation, detecting a target requirement in execution of the source installation, generating a target required signal to the at least one server, receiving the selected set of weightings, generating a set of range fractions from the weightings, each range representing a target installation and having a proportion of the range corresponding to the weighting, selecting randomly a number falling in the range and requesting from the server a notification of a target installation represented by the fraction of the range containing the number.

In yet another aspect, there is provided a computer program comprising program code instructions which, when executed by a processor causes said processor to: execute a source installation, detect a target requirement in execution of the source installation, generate a target required signal to at least one server in communication with said processor, receive a selected set of weightings, generate a set of range fractions from the weightings, each range representing a target installation and having a proportion of the range corresponding to the weighting, select randomly a number falling in the range, and request from the at least one server a notification of a target installation represented by the fraction of the range containing the number.

In another aspect, there is provided a computer readable storage device storing program code instructions which, when executed by a processor causes said processor to: execute a source installation, detect a target requirement in execution of the source installation, generate a target required signal to at least one server in communication with said processor, receive a selected set of weightings, generate a set of range fractions from the weightings, each range representing a target installation and having a proportion of the range corresponding to the weighting, select randomly a number falling in the range, and request from the at least one server a notification of a target installation represented by the fraction of the range containing the number.

In another aspect, there is provided a server comprising at least one memory holding a data structure comprising multiple entries, wherein each entry associates an application pairing with a weighting, each application pairing comprising a source installation and a target installation, and multiple targets, and at least one processor configured to execute a target selection algorithm which responsive to a target requirement signalled from a client: generates a set of range fractions from the weightings, each range representing a target installation and having a proportion of the range corresponding to the weighting; selects, based on random number generation, a number falling within the range; and transmits a notification of the target installation represented by the fraction of the range containing the number to the client.

In another aspect, there is provided a method of controlling an installation in a client or user device operable to communicate with at least one server having at least one memory holding a data structure comprising multiple entries, wherein each entry associates an application pairing with a weighting, each application pairing comprising a source installation and a target installation, and multiple targets, the method comprising: executing a target selection algorithm which responsive to a target requirement signalled from a client, generates a set of range fractions from the weightings, each range representing a target installation and having a proportion of the range corresponding to the weighting; selects, based on random number generation, a number falling within the range; and transmits a notification of the target installation represented by the fraction of the range containing the number to the client.

Other aspects and features are described with reference to the appended claims.

BRIEF DESCRIPTION OF DRAWINGS

To understand some embodiments, reference will now be made by way of example only to the accompanying drawings, in which.

DETAILED DESCRIPTION OF SOME EMBODIMENTS

Figure 1:
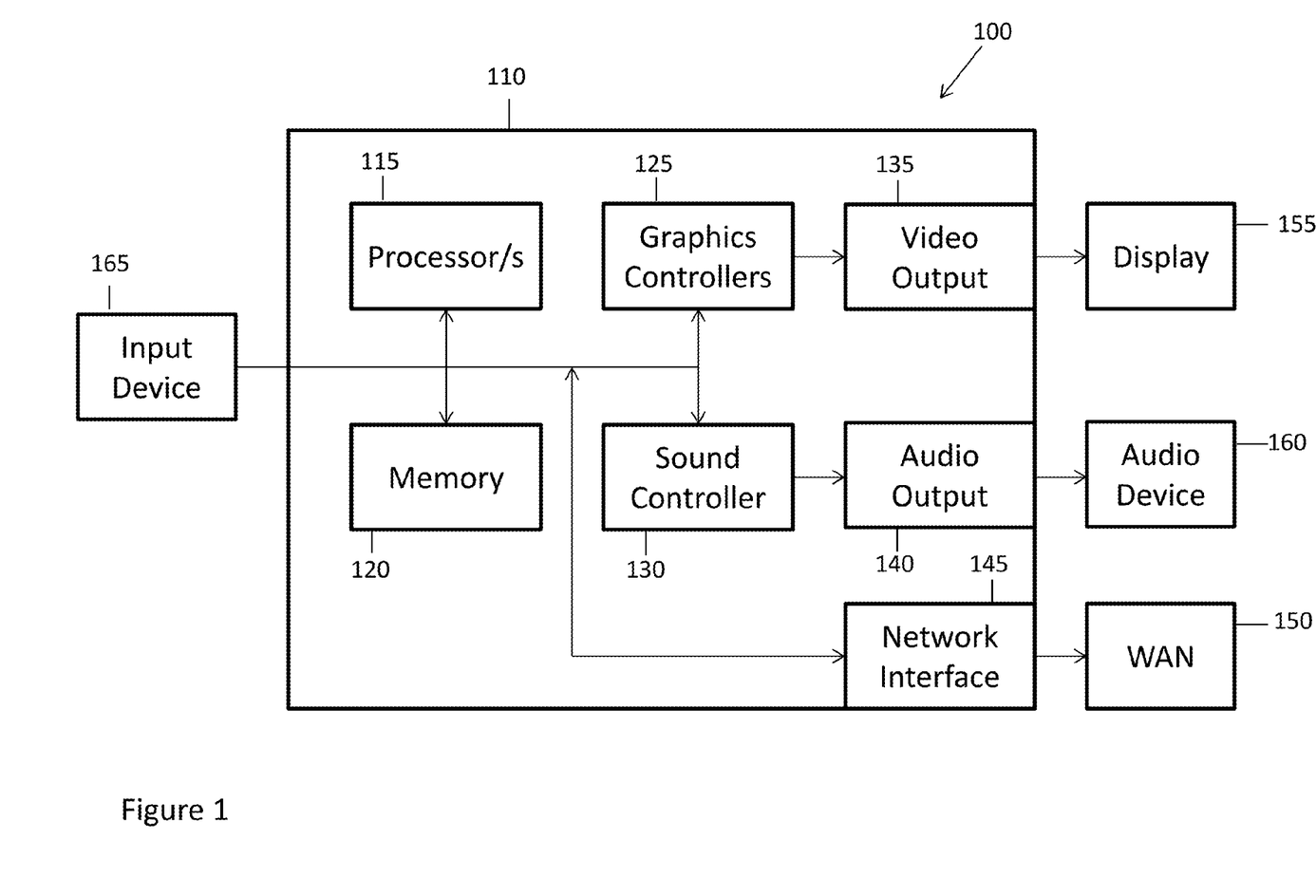
FIG. 1 shows an example client or user device of an embodiment.

A schematic view of a client or user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
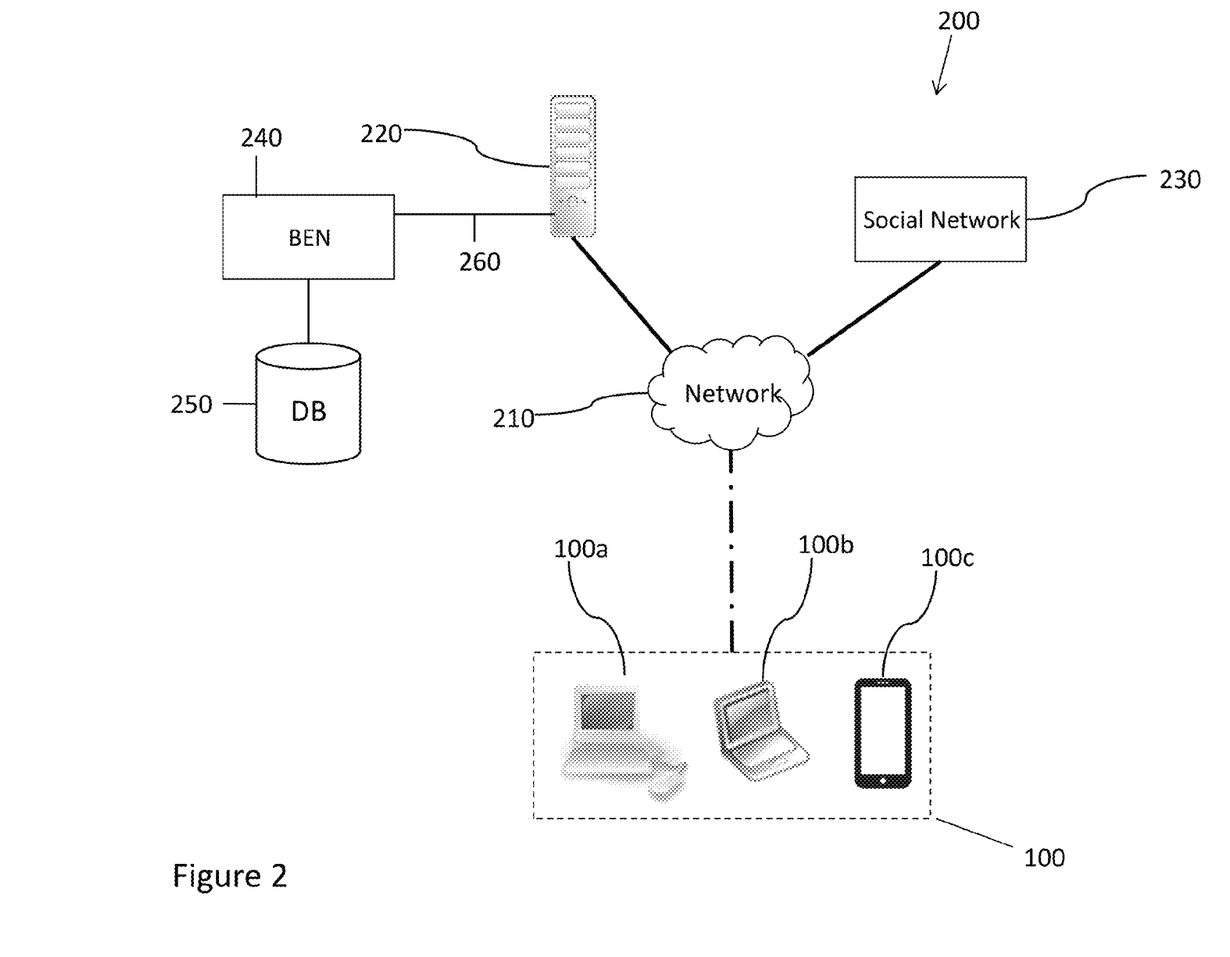
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more client or user devices 100, shown in the figure by way of example as user devices 100a, 100b and 100c, and may further provide connections to a social network 230 such as Facebook™.

Figure 9:
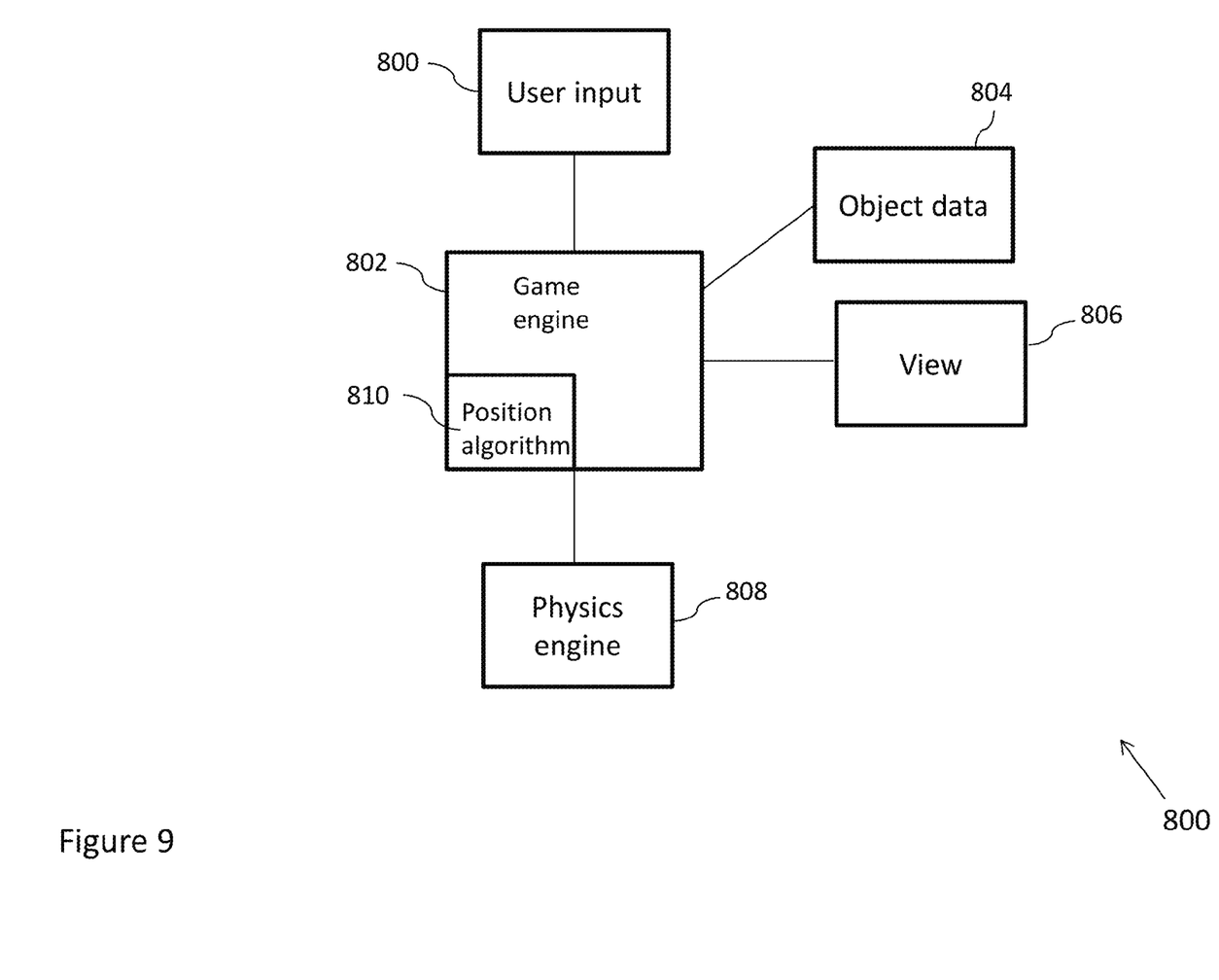
FIG. 9 illustrates function blocks of some embodiments.

Reference is made to FIG. 9 which schematically shows the functional blocks of an embodiment. The functional blocks may be implemented in the blocks described above with regard to FIG. 1, and may enable the user device 800 to engage in game play. A user input block 800 is shown. This captures the user input and feeds the input to a game engine 802. In the games of some embodiments, this user input may control the releasing of a game object and in the trajectory in which said object is released. This user input can be via any suitable user interface, as discussed earlier.

The game engine 802 will process the information provided by the user input. For example, in a game wherein the objective is to match elements of the same type by shifting their positions, the game engine may process the information provided by user input to move a game object and determine whether or not a match has been made.

Each object has object data 804 associated therewith. The object data 804 may be stored in any suitable memory location. In some embodiments, the object data 804 may be considered to be part of the game engine 802 and in other embodiments may be considered to be outside the game engine 802. The object data 804 may provide information as to the properties of an object. These properties can include attribute information such as colour and/or whether or not an object has a particular function such as a so-called booster function. The object data 804 may include the position data, that is, information representing the position of the object in the displayed image.

In some embodiments, the game engine 802 will check if a game object satisfies the rule or rules to be removed from the display. The rule or rules define whether or not a condition has been satisfied. The condition will be dependent on the game. In some embodiments, said condition will be satisfied if the game objects are arranged to provide a sequence of at least three adjacent objects sharing at least one same characteristic.

In other embodiments, the condition will be met if the game object is in contact or close proximity with another game object.

Thus, in some embodiments, the game engine 802 will be in control of determining whether or not to remove objects. The game engine 802 will have access to data for each object including its position and the at least one characteristic associated with the object, and will be able to determine if a removal condition has been met. If a removal condition is met, the objects in the match may be removed from the game area.

A physics engine 808 is provided which is configured to control the movement of moving objects on the display, for example the game objects in the arrangement or the player object. A player object may be a game object which is displayed moving along a determined target path. The physics engine may manage the movement of an object based on, for example, gravity which controls the falling of the object, a wave mechanism, collision detection, when the falling object hits another object and optionally rotation calculations when the falling object rolls, for example, down the side of the other objects. The physics engine may manage the movement of an object in dependence on a determined target path.

The movement of the object is thus controlled by the physics engine 808, which will control the movement of objects in the game area.

The physics engine 808 may be part of the game engine 802 or separate therefrom. In some embodiments, the physics engine 808 function may be provided by a physics engine in conjunction with another function, separate to the physics engine. That separate function may be a separate physics engine, part of the game engine or provided by one or more processors.

A position control block 810 is provided. In the embodiment shown, this position control block may be part of the game engine. In other embodiments, this position control block may be outside the game engine. The position control block may be provided by a position algorithm in some embodiments.

A view function 806 uses the object data to provide the displayed image with which the user is able to view and/or interact.

Figure 3:
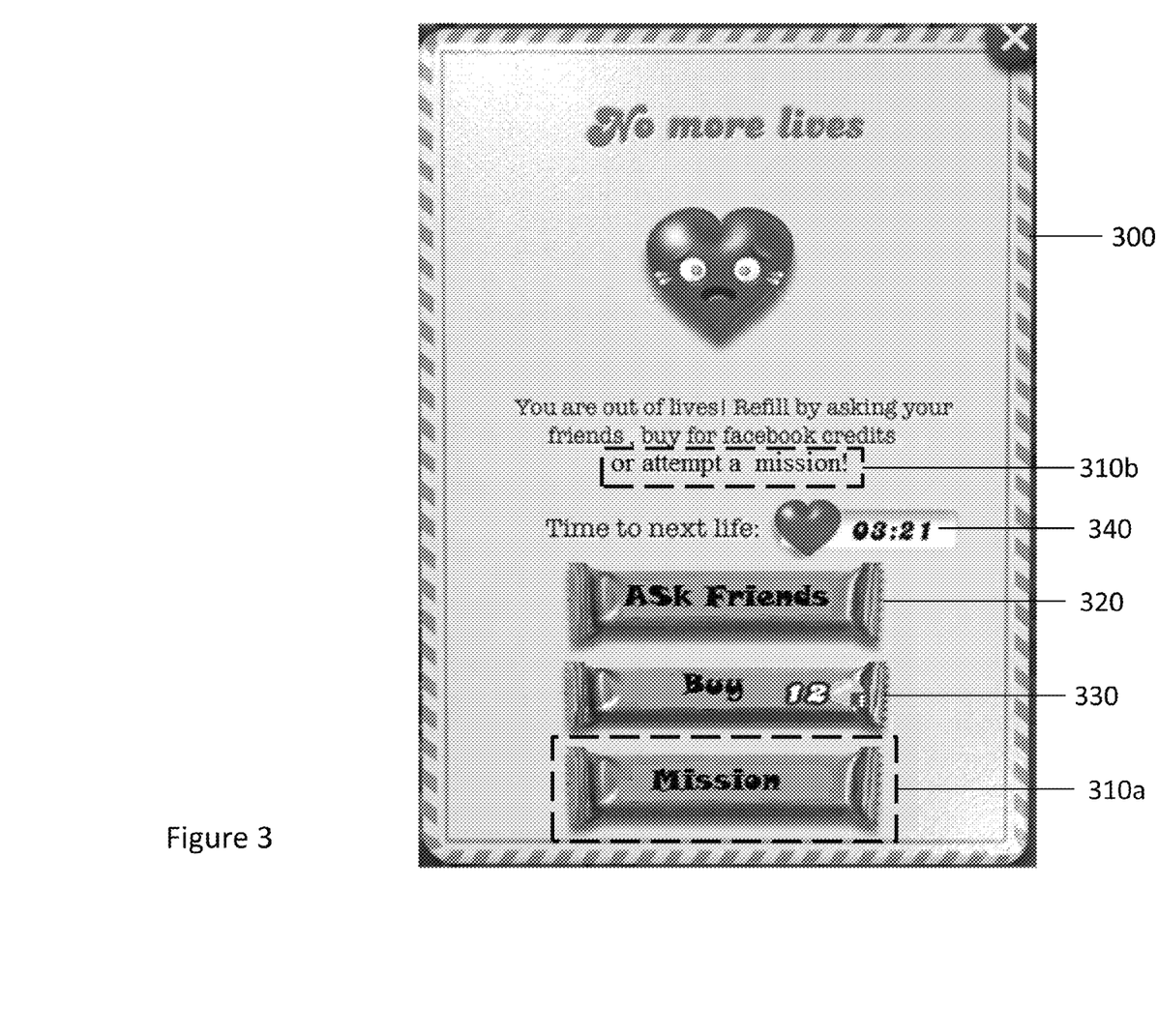
FIG. 3 shows an example notification according to some embodiments.

FIG. 3 shows an embodiment of a notification screen. FIG. 3 includes a notification message 300, informing the user of the client device 100a, 580 of various status regarding the source installation. In this instance the source installation comprises a computer game. As can be seen in the notification 300, an option described as a "mission" 310a with a message 310b is provided, in addition to the more usual notifications comprising asking friends for help 320 or buying extra credits/lives 330.

As can be seen in the notification 300, a time 340 or count down is indicated which the user must wait to pass if they do not select any of the options 310a, 320, 330. The time may however be bypassed by the user selecting the mission option 310a as will now be described in more detail with reference to FIG. 4 and FIG. 5.

Figure 4:
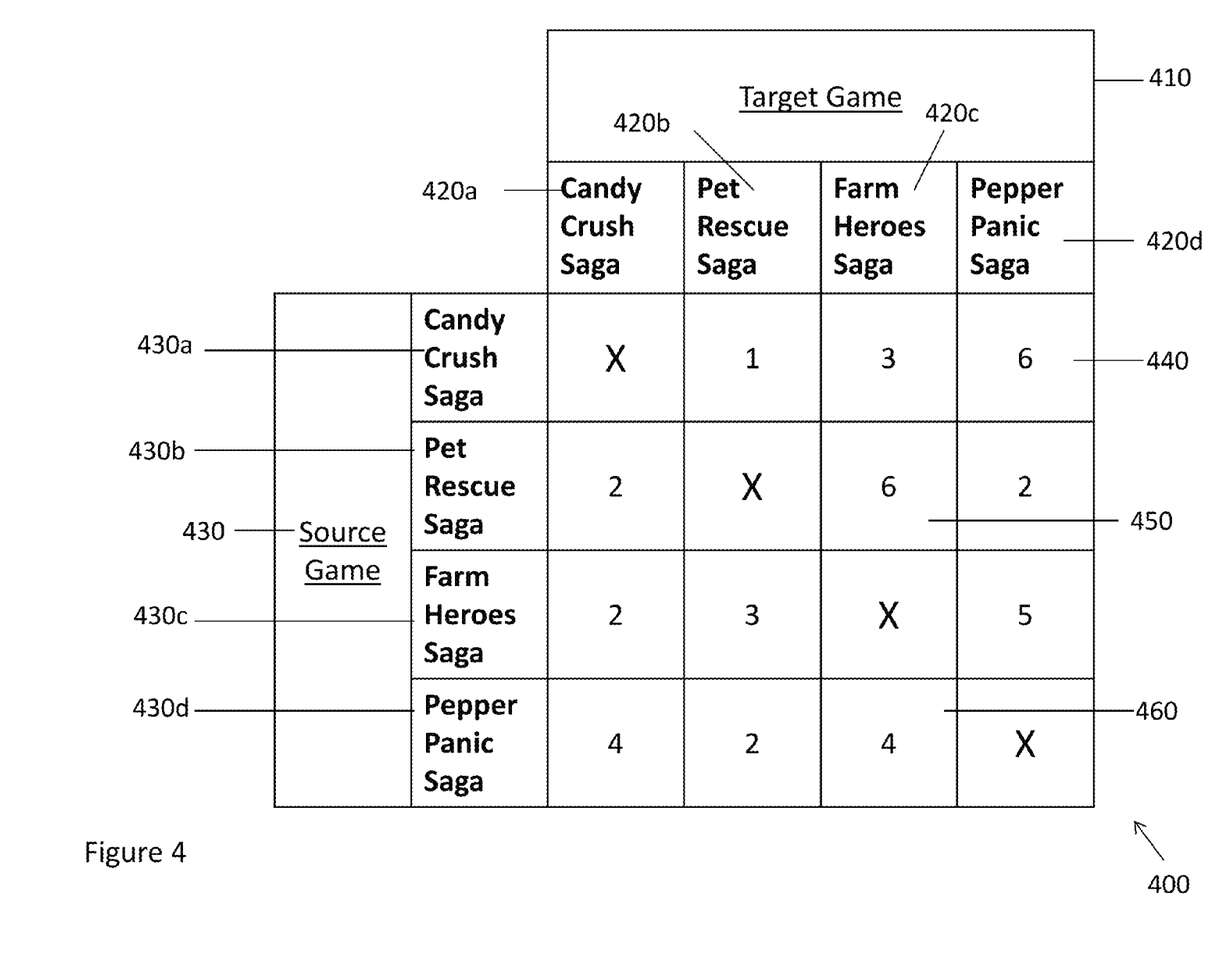
FIG. 4 illustrates an example table according to some embodiments.

FIG. 4 illustrates an example data structure 400 comprising multiple entries, the entries associated with application pairing and weighting. The table 400 illustrates a source installation 430. In this example these comprise computer implemented game installations 430a, 430b, 430c, 430d. Source Installations 430 may comprise other applications from other service providers, provided such arrangements are in place between the service providers.

Also shown in the Figure are target installations 410, in this case representing other computer implemented game installations, the game installations 420*a*, 420*b*, 420*c*, 420*d* forming a matrix data structure with the source installation data 430.

Whilst FIG. 4 illustrates a two dimensional table to aid understanding, it should be recognised that other data structures may be applied, for example vectors or multidimensional arrays. Of note is the pairing of a target installation 410 with a source installation 430 based on respective weightings 440, 450, 460 for the pairing.

In an embodiment the at least one server 220, 560 may for example provide weightings 440, 450, 460 linking a source installation 430 with a target installation 410. For example, with reference to FIG. 4, a source installation "Candy Crush Saga™" 430*a* generates a weighting of one "1" for the target installation of "Pet Rescue Saga™" 420*b*, a weighting of three "3" for "Farm Heroes Saga™" 420*c*, and a weighting of six "6" for "Pepper Panic Saga™" 420*d*. The weightings are generated by the server 220 for example based on key performance indicators collected by or provided to the server 220. Key performance indicators may for example comprise the number of times or accesses that the user or client device 100*c* has accessed the installation 430*a*, the level or time spent in or using the installation 430*a*, the user device locale, location, geo-location and user device platform.

For example the user or client device may operate through Microsoft Windows™, Apple iOS™, or the Android™ or a Linux or Unix or other suitable operating system.

The interaction of the weightings and user or client device selection of a target will now be further described with reference to FIG. 5A and FIG. 5B.

Figure 5A:
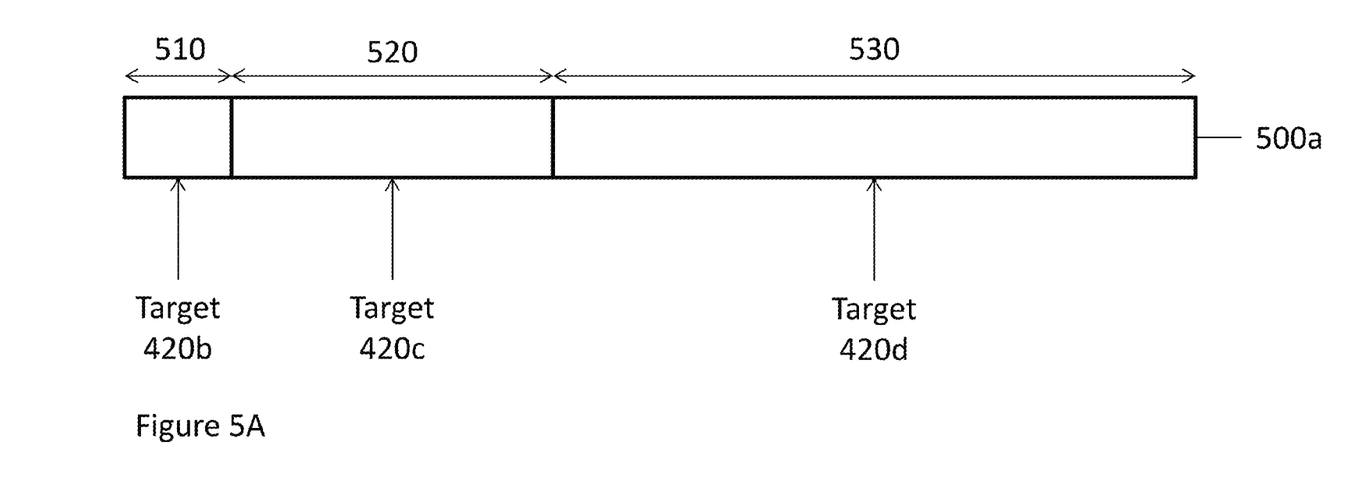
FIGS. 5A and 5B are diagrams illustrating example fraction ranges according to some embodiments.

FIG. 5A shows an embodiment of a generated range fraction based on the weightings of the first row 430*a* of table 400 of FIG. 4. As can be seen in FIG. 5A, the range fraction 500*a* comprises a first fraction 510 associated with the weighting of target 420*b*, i.e. a fraction of one "1" with reference to FIG. 4, a range fraction 520 associated with target 420*c* having a weighting of three "3", and a range fraction 530 corresponding to the target installation 420*d* having a corresponding weighting of six "6".

Figure 5B:
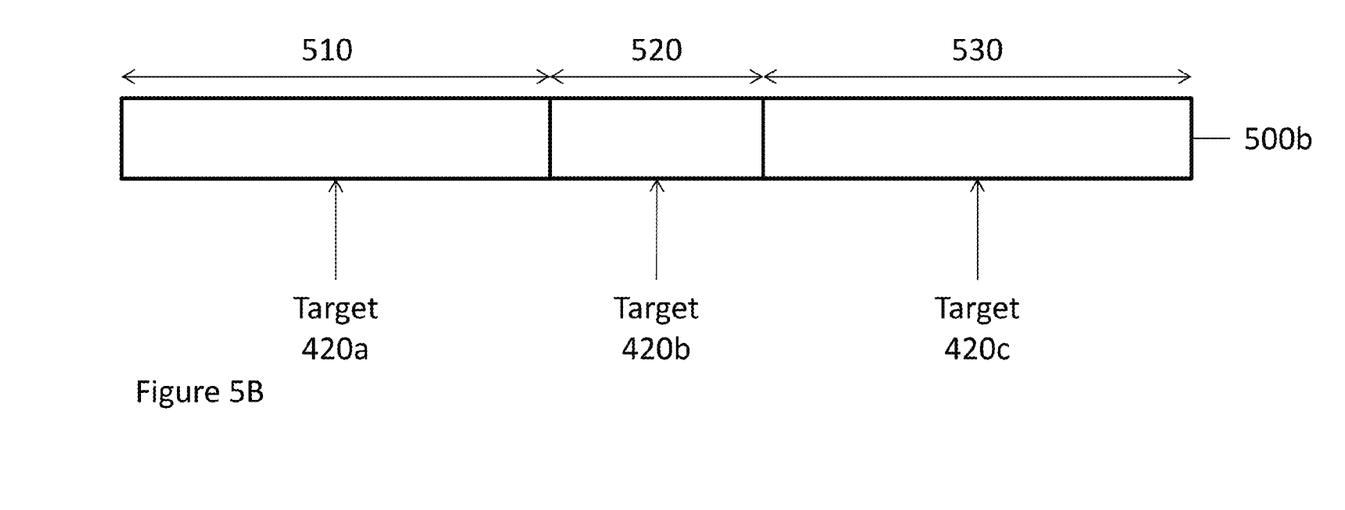

FIG. 5B similarly shows an example range fraction 500*b* generated from the last row of the table of FIG. 4, corresponding in this embodiment to a source installation 430*d* of "Pepper Panic Saga™". The range fraction 500*b* comprises a first fraction 510 corresponding to target installation 420*a* having a weighting of four "4", the second range fraction 520 having a target installation of 420*b* having a weighting of two "2", and a third range fraction 530 associated with target 420*c* having a weighting of four "4".

The range fractions are informed by the weightings 440, 450, 460, which themselves are informed by key performance indicators as previously described.

Figure 6:
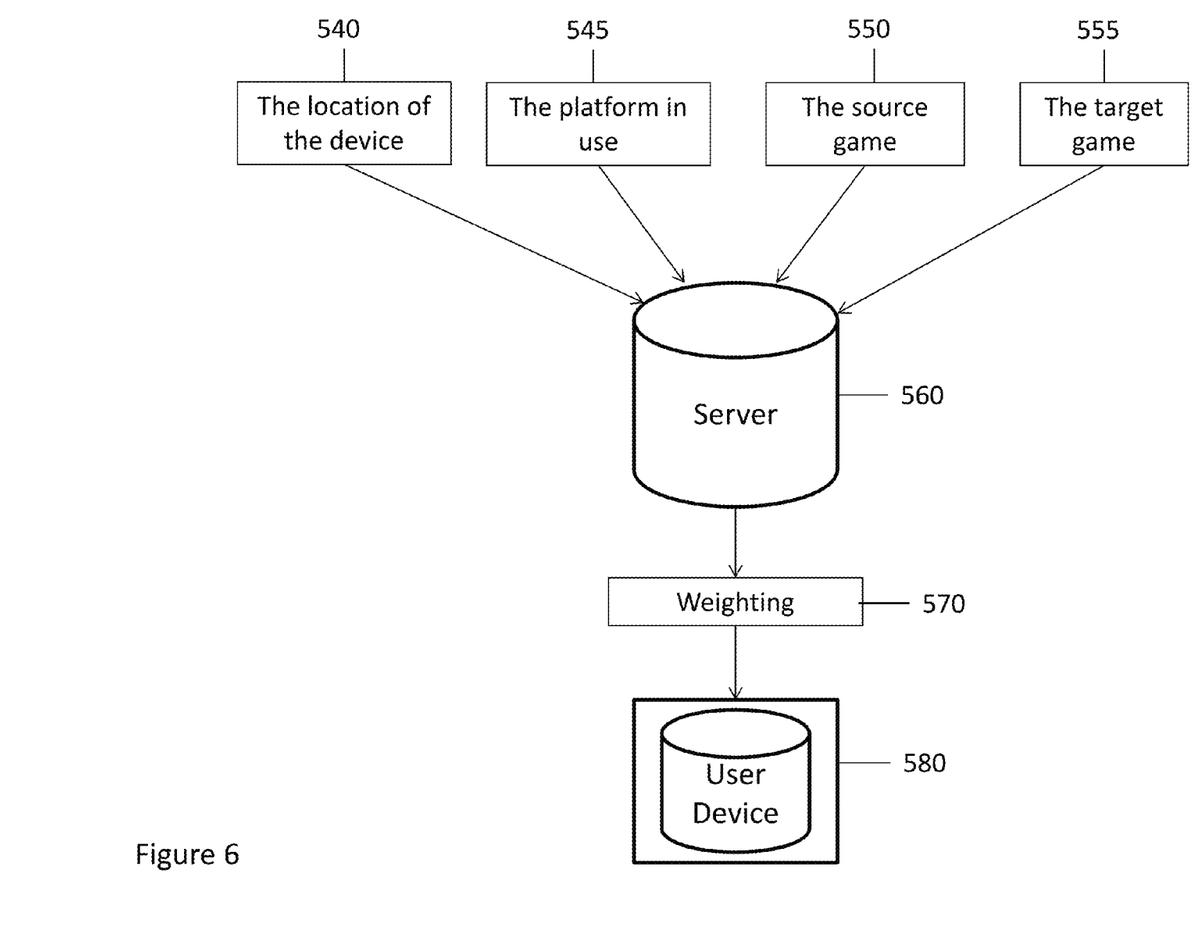
FIG. 6 is a diagram indicating interaction within a system according to an embodiment.

The use and interaction of an embodiment of a system with such a range fraction scheme will now be described with reference to FIG. 6, which shows a system comprising a server 560 generating a weighting 570 and providing such a weighting to a user device 580, 100*a*, 100*b*, 100*c*. The server 560 may then generate the weightings based at least in part on for example, the location of the device 540 if reported to the server 560, the platform in use 545 as previously described, the source installation 430, 550, and the target installation 555. Additionally, the weightings may also be dependent upon the games other than the source installation that are installed at the user device. For example, the source installation, through which the mission request is generated, may be Farm Heroes Saga. However, the user device 100 may also have the game 'Candy Crush Saga'. When the weightings are determined, an indication that the game 'Candy Crush Saga' has been installed (the indication may be stored both in the memory 115 of the device 100 and a database 250 at the server-side) may be used, among other factors to determine the weightings for the various target installations.

Figure 7:
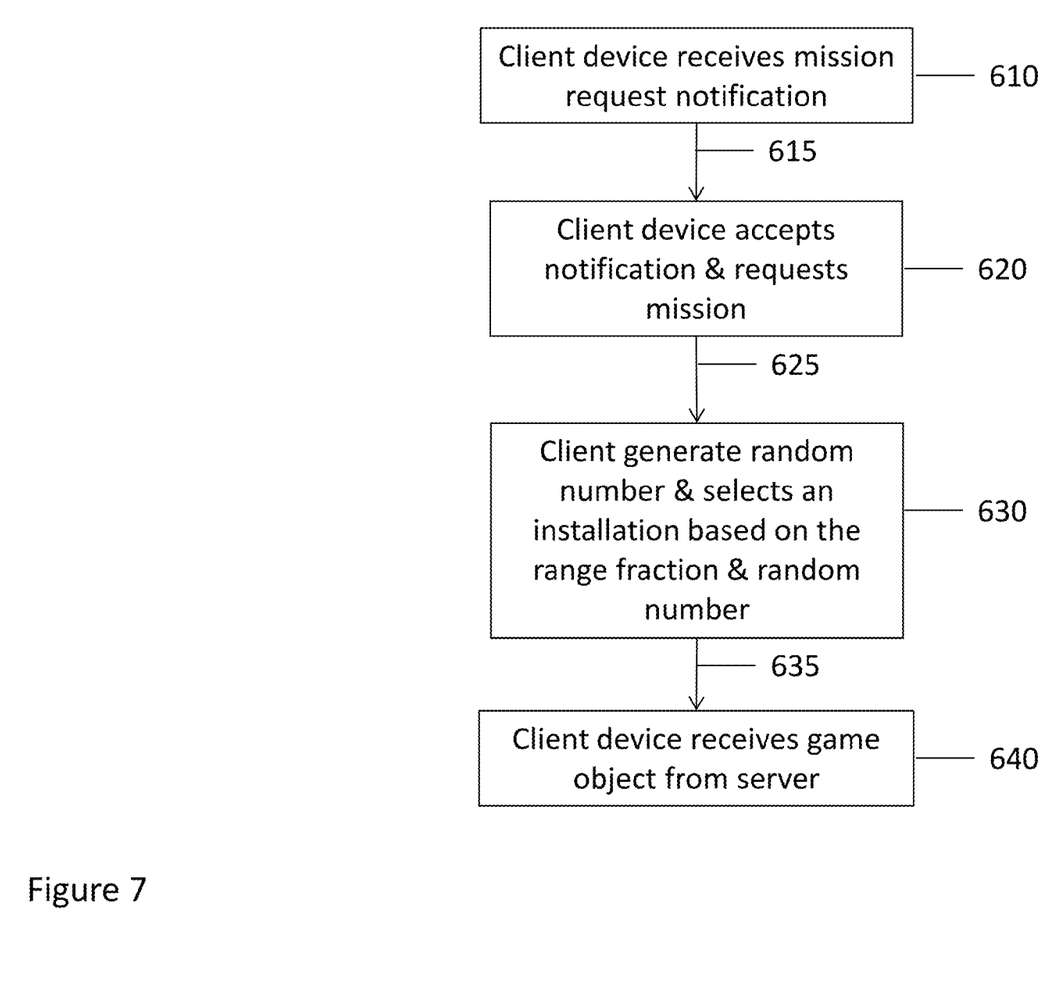
FIG. 7 depicts a flowchart of a method according to an embodiment.

An embodiment of the process will now be described with reference to the flowchart of FIG. 7. At step 610 the client or user device 100*a*, 100*b*, 100*c*, 580 may receive a mission request notification as shown for example in FIG. 3. The processor 220, 240, 115 may then proceed via path 615 to step 620 at which the client device 580, 100*a*, 100*b*, 100*c* accepts notification and requests the so-called "mission" or target installation 420*a*, 420*b*, 420*c*.

The client device then proceeds via path 625 to step 630 and generates a random number and selects a target installation based on the range fraction 510; 520; 530 within which that random number falls.

Optionally, the client device may then receive at step 640 via path 635 one or more assets which may be associated with the source installation 430. The asset may comprise a game object in the form of a "reward" to the user for accepting and trying a target installation 410.

By way of example, the one or more assets may comprise game objects selected from one or more of real world currency, in-game or application currency (e.g. "bitcoins"), in game "lives" or "boosters" or "gifts" for friends, and/or for example an automatic promotion to for example a rank or level of the source installation.

Hence, a system is provided in which the client or user device 580, 100*a*, 100*b*, 100*c* requires no update or special software, regardless of its platform, in order to be offered, notified and to select, a proffered target installation.

Figure 8:
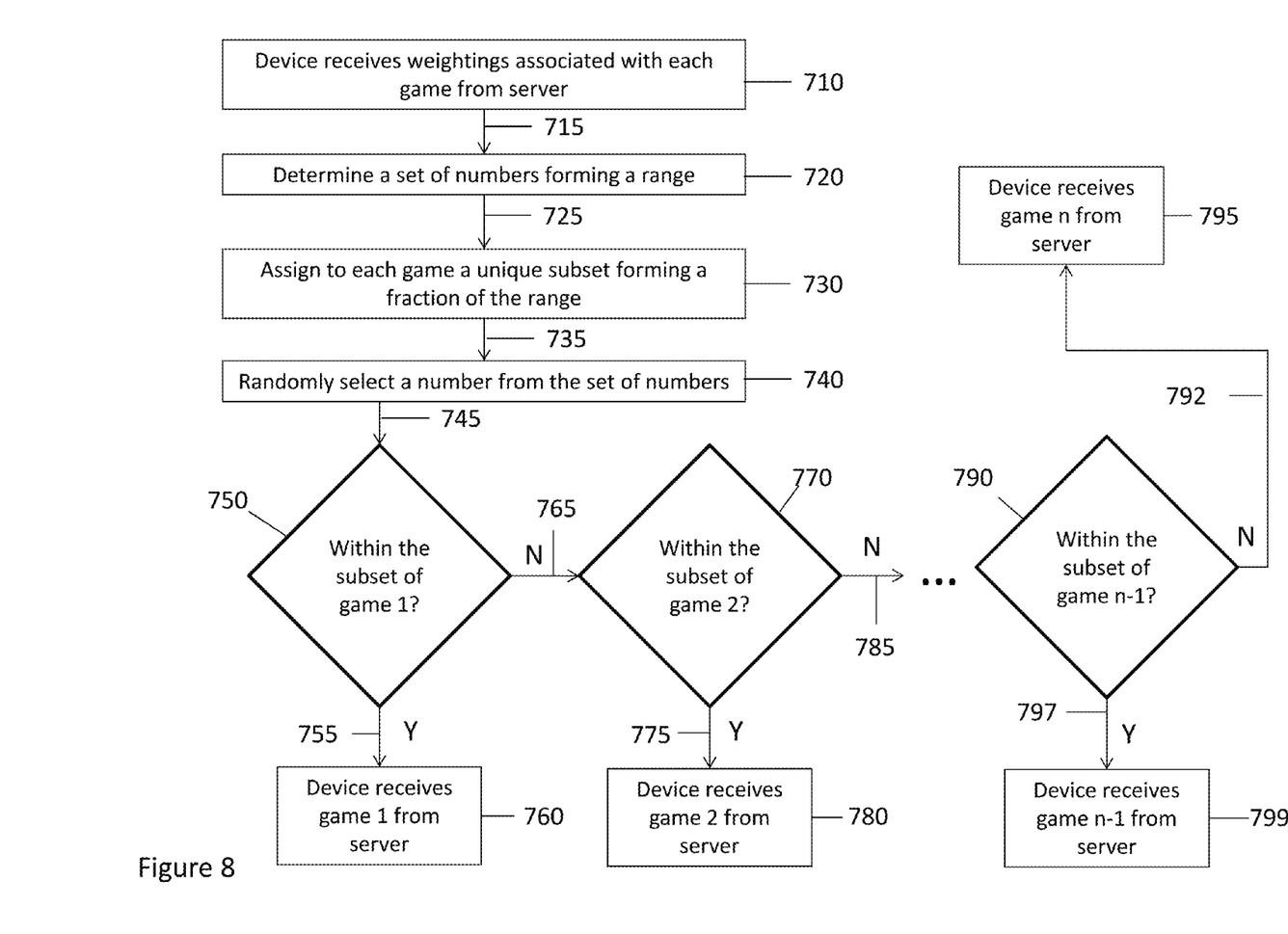
FIG. 8 illustrates a flowchart of a method according to another embodiment.

FIG. 8 illustrates a flow diagram of a method according to an embodiment in more detail. At step 710, the client device 580, 100*a*, 100*b*, 100*c* receives weightings associated with each paired source and target installation from the server 220. In one embodiment, the weightings may be downloaded from the server 220 and stored in the memory 120 as part of the game that is initially downloaded through the WAN 150 from the server 220. Alternatively, the weightings may be downloaded when the device 100 determines that a user request has been made for a mission. In this case, the device 100 may produce a mission request notification and transmit the notification across the network 210 to a server 220. The server 220 may then retrieve the weightings from the database 250 and transmit them to the device 100 to be stored in memory 115.

Flow then proceeds via step 715 to step 720 wherein the device or the server determines a set of numbers forming a range 500*a*, 500*b*, as previously described with reference to FIG. 5A and FIG. 5B.

The method then proceeds via step 725 to step 730 wherein each installation is assigned a unique subset or fraction of the range. This assignment may be achieved on the basis of data comprising weightings such as that shown in FIG. 4. In one embodiment, the weightings may be stored in the memory 120. The processor 115 may then load the weightings from the memory at step 730 and use them to divide the range determined in step 720 into subsets whose size is proportional to the magnitude of each weighting.

The user client device may then proceed via step 735 to step 740 wherein a random number is generated so as to fall within the range of the set of numbers.

Flow may then proceed via 745 to decision or comparison step 750 wherein the processor determines whether the randomly selected number falls within the range fraction or subset of the range 510 associated with the first installation 420*a*. If the random number does fall within the range fraction 510 then flow proceeds via path 755 (Y) to step 760 wherein the user client transmits a request for installation of the target game 420a associated with the first subset or range fraction 510 to the server 220. The server 220 then responds by transmitting the requested installation 420a to the device 100.

If the random generated number does not fall within a subset of the first range fraction 510, flow proceeds via path 765 to decision or comparison step 770 wherein a check is made as to whether the random number falls within the subset 520 associated with the second installation 420b. Should the random number fall within the second subset 520 associated with the second installation 420b, then the process proceeds via path step 775 (Y) to step 780 wherein the user or client device receives the second target installation 420b from the server 220, 560.

Should the random number neither fall within the subset of installation 1, (step 750) nor the subset of installation 2 (step 770) then the process is repeated for the remaining range fractions and associated installations up to n−1 iterations as shown at step 790 until a match is found via path 797 to step 799, or the last installation (installation n) is selected at step 795 via path 792 from comparison step 790 for installation.

Therefore, a flexible method is provided allowing for large dynamic ranges encompassing many or a plurality of potential target installations, associated with a source installation, the method providing proffered target installations paired with at least one source installation of a user device in a transparent and efficient manner.

Although in the embodiment described with respect to FIG. 8, the weightings are downloaded from the server 220 and stored in the memory 115, it would be understood by the person skilled in the art, that the weightings may not be downloaded, but that the process of determining a target game may be carried out at the server. In this, case the server may receive a mission request notification, perform the necessary determination of a target game, and transmit the target game installation to the device 100.

Furthermore, the service provider, at the server side 220 or back end 240, may provide alternative target installations 420a, 420b, 420c, based on calculated weightings 440, 450, 460 themselves based at least in part on key performance indicators (KPI) based on collected data. Hence a transparent and platform independent interpretation mechanism is provided to a user or client device 100a, 100b, 100c to enable easy proffering and acceptance of further or target installations, should the client so desire.

Since the optimisation algorithm is decoupled from the client device or "client side", the KPIs can be modified without the user device having to adjust its interpretation of the weightings that it receives.

In an embodiment, all of weightings stored at the server-side, in for example a database 250, may initially be set to one "1", yielding a uniform probability distribution of selection of the target installation, i.e. each target installation may be equally likely to be suggested to the user or client device. These weightings may then be updated in response to received data. For example, as was described with respect to FIG. 6, the weightings may be determined on the basis of information which is specific to the user device 100 in question, such as the location of the device 540 or the platform in use 545. However, the effect that these factors have on the weightings and the effect that the particular source game and target game has on an individual weighting may be determined on the basis of other information such as KPIs.

The KPIs may be updated based on data collected from multiple user devices. The server 220 may collect data, such as games installed, time spent playing a game, successes or failure on a game from a plurality of user devices. These factors may then be used to generate KPIs. In one embodiment, a set of KPIs may be assigned to each user device. The values of a set of KPIs for a single user device 100 may be determined based on the data collected from that user device 100 and then used to determine the weightings. Alternatively or additionally, a single set of KPIs may be determined and assigned to a plurality of user devices, such that the same KPIs are used to determine the weightings used for the plurality of user devices.

In the above, the server generates and sends the weightings, and any text/images associated with the missions and the reward (conditional to the completion of the mission).

The user device receives these and performs its decision process as described above. The client chooses the mission to show based on the weightings using the algorithm described above—the weightings are a simple numeric, the KPIs can be changed at the server because a simple numeric is always used at the client.

Hence this decouples software shipped to the client with the optimisation algorithms at the server side, so there is no need to change the software if a change to a KPI is required to control target selection and proffering.

In an embodiment, the service provider may configure different creatives (text and notification messages, images) on the server side and monitor the effects such creative have on selections, to inform KPIs.

In an embodiment the country or geo-location may be based on the language selected by the user, and the geo-location may influence the weights provided as a client device or user alters region or country.

Advantageously, the service provider may tailor the proffered paired source and target installations based on collected data comprising for example geographical based and platform based preferences, amongst other user preferences and other key performance indicators as previously described.

Therefore a powerful system is provided that may be tailored to the geographical region, platform and/or the user without the user or client device requiring further installations or updates to receive offerings of paired target installations associated with at least one source installation installed on said client device.

Furthermore, the decoupling of the target selection algorithm on the server side from the client device enables key performance indicator modification without the need for the client device to download or adjust the interpretation algorithm on the client side of the weightings received in relation to target installations.

Hence, aspects of the invention decouple the selection of KPIs at a server side from a client side selection of a target via the use of a numeric vector of weightings.

A person skilled in the art will realise that the different approaches to implementing the apparatus, systems, device and installations disclosed herein are not exhaustive, and what is described herein are certain preferred embodiments. It is possible to implement the way in a number of variations without departing from the spirit or scope of the invention.

The invention claimed is:

1. A system comprising at least one server having at least one hardware processor and at least one memory holding a data structure comprising multiple entries, wherein each entry associates an application pairing with a weighting, each application pairing comprising a source installation and a target installation, and multiple targets, and the hardware processor configured to execute a target selection algorithm which selects a set of weightings to be transmitted to a client or user device wherein said client or user device is in communication with the at least one server and comprises a processor configured: to execute a source installation, to detect a target requirement in execution of the source installation, to cause a notification message to be displayed at the user or client device, the notification message requesting an input from a user and to generate, in response to receiving the requested user input at the client or user device, a target required signal to the at least one server, to receive the set of weightings, to generate a set of range fractions from the weightings, each range representing a target installation and having a proportion of the range corresponding to the weighting, and to select randomly a number falling in the range and to request from the server a notification of a target installation represented by the fraction of the range containing the number.

2. The system of claim 1, wherein the set of weightings are transmitted to a client or user device responsive to a target requirement signalled from the client.

3. A system according to claim 1, wherein said weightings are numeric.

4. A system according to claim 1, wherein said weightings selected are pairings including at least a source game being executed at the client device.

5. A system according to claim 1, wherein said installations comprise computer implemented games.

6. A system according to claim 1, wherein the data structure includes selection parameters which identify user or client characteristics, the weighting being based on one or more of the user or client characteristics.

7. A system according to claim 6, the one or more user or client characteristics comprising one or more of a location of the user or client; and the platform or operating system of the user or client.

8. A system according to claim 6, wherein the weightings are equal in the absence of user or client characteristics.

9. A system according to claim 6, wherein the weightings are non-equal based on the one or more user or client characteristics.

10. A system according to claim 1, wherein the weightings are based on key performance indicators collected by said at least one server.

11. A system according to claim 1, wherein the key performance indicators collected by said at least one server are altered or varied to modify the weightings.

12. A system according to claim 1, wherein the client or user device is adapted to determine the location of said device and comprises a transceiver to provide said at least one server said determined location.

13. A client or user device comprising at least one hardware processor configured to receive via a communication link with at least one server a source installation and to execute said source installation, and further configured to detect a target requirement in execution of the source installation, to cause a notification message to be displayed at the user or client device, the notification message requesting an input from a user and to generate, in response to receiving the requested user input at the client or user device, a target required signal to the at least one server via said communication link, to receive a set of weightings from said server, to generate a set of range fractions from the weightings, each range representing a target installation provided by said at least one server and having a proportion of the range corresponding to the weighting, and to select, based on random number generation, a number falling within the range and to request from the at least one server a notification of a target installation represented by the fraction of the range containing the number.

14. A server comprising at least one hardware processor and at least one memory holding a data structure comprising multiple entries, wherein each entry associates an application pairing with a weighting, each application pairing comprising a source installation and a target installation, and multiple targets, and the hardware processor configured to execute a target selection algorithm which selects a set of weightings to be transmitted to a client or user device, the target selection algorithm being executed in response to a target requirement signaled from the client or user device to the server, the target requirement being signaled from the client or user device in response to receiving a requested user input at the client or user device, to transmit the set of weightings to said client or user device, and to provide a notification of the target installation based on where a random number generated by said client or user device falls within a fraction of a generated range containing the number.

15. A method of controlling an installation in a client or user device operable to communicate with at least one server having at least one memory holding a data structure comprising multiple entries, wherein each entry associates an application pairing with a weighting, each application pairing comprising a source installation and a target installation, and multiple targets, the method comprising:
    executing a target selection algorithm which selects a set of weightings to be transmitted to the client or user device responsive to a target requirement signalled from the client or user device;
    executing a source installation,
    detecting a target requirement in execution of the source installation,
    displaying a notification message at the client or user device, the notification message requesting a user input from a user,
    generating, in response to receiving the requested user input at the client or user device, a target required signal to the at least one server,
    receiving the selected set of weightings,
    generating a set of range fractions from the weightings, each range representing a target installation and having a proportion of the range corresponding to the weighting,
    selecting randomly a number falling in the range and
    requesting from the server a notification of a target installation represented by the fraction of the range containing the number.

16. A method according to claim 15, wherein said weightings are numeric integers.

17. A method according to claim 15, wherein said weightings selected are pairings including at least a source game being executed at the client or user device.

18. A method according to claim 15, wherein the data structure includes selection parameters which identify user or client characteristics, the weighting being based on one or more of the user or client characteristics.

19. A method according to claim 18, wherein the one or more user or client characteristics comprise one or more of a geographical location of the user or client; the platform or operating system of the user or client device; and one or more games installed at the user or client device.

20. A method according to claim 15, wherein the weightings are based on key performance indicators collected by said at least one server, said key performance indicators capable of being altered or varied to modify the weightings.

21. A method according to claim 15, wherein the client or user device further receives an asset associated with the source or target installation upon selection of said target installation, wherein the received asset comprises one or more game objects selected from one or more of real world currency, in-game currency, application currency, in game lives, boosters, gifts, and a reward comprising an automatic promotion to a level or rank of the source installation.

22. A non-transitory computer readable medium storing program code instructions which, when executed by a processor causes said processor to:
  execute a source installation,
  detect a target requirement in execution of the source installation,
  display a notification message, the notification message requesting a user input form a user,
  generate, in response to receiving the requested user input, a target required signal to at least one server in communication with said processor,
  receive a selected set of weightings,
  generate a set of range fractions from the weightings, each range representing a target installation and having a proportion of the range corresponding to the weighting,
  select randomly a number falling in the range, and
  request from the at least one server a notification of a target installation represented by the fraction of the range containing the number.

23. A server comprising at least one hardware processor and at least one memory holding a data structure comprising multiple entries, wherein each entry associates an application pairing with a weighting, each application pairing comprising a source installation and a target installation, and multiple targets, and the hardware processor configured to execute a target selection algorithm which responsive to a target requirement signalled from a client, wherein the target requirement is signaled from the client in response to receiving a requested user input at the client or user device,
  generates a set of range fractions from the weightings, each range representing a target installation and having a proportion of the range corresponding to the weighting;
  selects, based on random number generation, a number falling within the range; and transmits a notification of the target installation represented by the fraction of the range containing the number to the client.

24. A method of controlling an installation in a client or user device operable to communicate with at least one server having at least one memory holding a data structure comprising multiple entries, wherein each entry associates an application pairing with a weighting, each application pairing comprising a source installation and a target installation, and multiple targets, the method comprising:
  executing a target selection algorithm which responsive to a target requirement signalled from a client, wherein the target requirement is signaled form the client in response to receiving a requested user input at the client or user device, generates a set of range fractions from the weightings, each range representing a target installation and having a proportion of the range corresponding to the weighting;
selects, based on random number generation, a number falling within the range; and
transmits a notification of the target installation represented by the fraction of the range containing the number to the client.

* * * * *